(12) United States Patent
Cunningham, IV

(10) Patent No.: US 9,111,166 B2
(45) Date of Patent: Aug. 18, 2015

(54) CLUSTER COMPUTING OF BAR CODE DATA

(75) Inventor: Charles Joseph Cunningham, IV, Broomall, PA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 648 days.

(21) Appl. No.: 13/222,046

(22) Filed: Aug. 31, 2011

(65) Prior Publication Data

US 2013/0048726 A1 Feb. 28, 2013

(51) Int. Cl.
*G06K 19/00* (2006.01)
*G06K 7/14* (2006.01)

(52) U.S. Cl.
CPC ................................... *G06K 7/1491* (2013.01)

(58) Field of Classification Search
USPC ......................................................... 235/462
See application file for complete search history.

(56) References Cited

U.S. PATENT DOCUMENTS

| | | | |
|---|---|---|---|
| 5,566,441 A | 10/1996 | Marsh et al. | |
| 5,925,869 A | 7/1999 | Still et al. | |
| 6,147,604 A | 11/2000 | Wiklof et al. | |
| 6,264,106 B1 | 7/2001 | Bridgelall | |
| 6,371,375 B1 | 4/2002 | Ackley et al. | |
| 6,557,758 B1 | 5/2003 | Monico | |
| 7,114,654 B2 | 10/2006 | Chapman et al. | |
| 7,177,958 B1 | 2/2007 | LaBlanc et al. | |
| 7,546,953 B1 * | 6/2009 | Collins, Jr. | 235/462.43 |
| 2003/0036425 A1 | 2/2003 | Kaminkow et al. | |
| 2004/0124982 A1 | 7/2004 | Kovach | |
| 2006/0032925 A1 | 2/2006 | Acosta | |
| 2007/0158436 A1 | 7/2007 | Ichikawa et al. | |
| 2008/0238611 A1 | 10/2008 | Costa et al. | |
| 2008/0272886 A1 | 11/2008 | Tiller et al. | |
| 2009/0091452 A1 | 4/2009 | Himmel | |
| 2010/0294840 A1 | 11/2010 | Barry | |

FOREIGN PATENT DOCUMENTS

| | | |
|---|---|---|
| EP | 0911755 A3 | 10/1998 |
| EP | 1355258 A2 | 10/2003 |
| EP | 2573704 A | 3/2013 |
| WO | WO2008098392 A1 | 8/2008 |

OTHER PUBLICATIONS

European Patent Search Report for Application No. 1218925.4 (EP2573704), dated Aug. 31, 2014, 3 pages.
European Office Action for Application No. 12181925.4-1806, Dated Sep. 3, 2014, 5 pages. All references were previously cited in European Search Report Aug. 13, 2014 (IDS filed Aug. 29, 2014).

* cited by examiner

*Primary Examiner* — Matthew Mikels
(74) *Attorney, Agent, or Firm* — Additon, Higgins & Pendleton, P.A.

(57) ABSTRACT

A reading system including: a primary reader for reading an information bearing device (IBD) having encoded IBD data provided therein for packetizing the encoded data and processing a first data packet of the packetized encoded data and transmitting a second data packet of the packetized encoded data; at least one auxiliary reader for receiving and processing the second data packet and the transmitting the processed second data packet; and wherein the processed first and second data packets are combined to produce decoded IBD data.

18 Claims, 3 Drawing Sheets

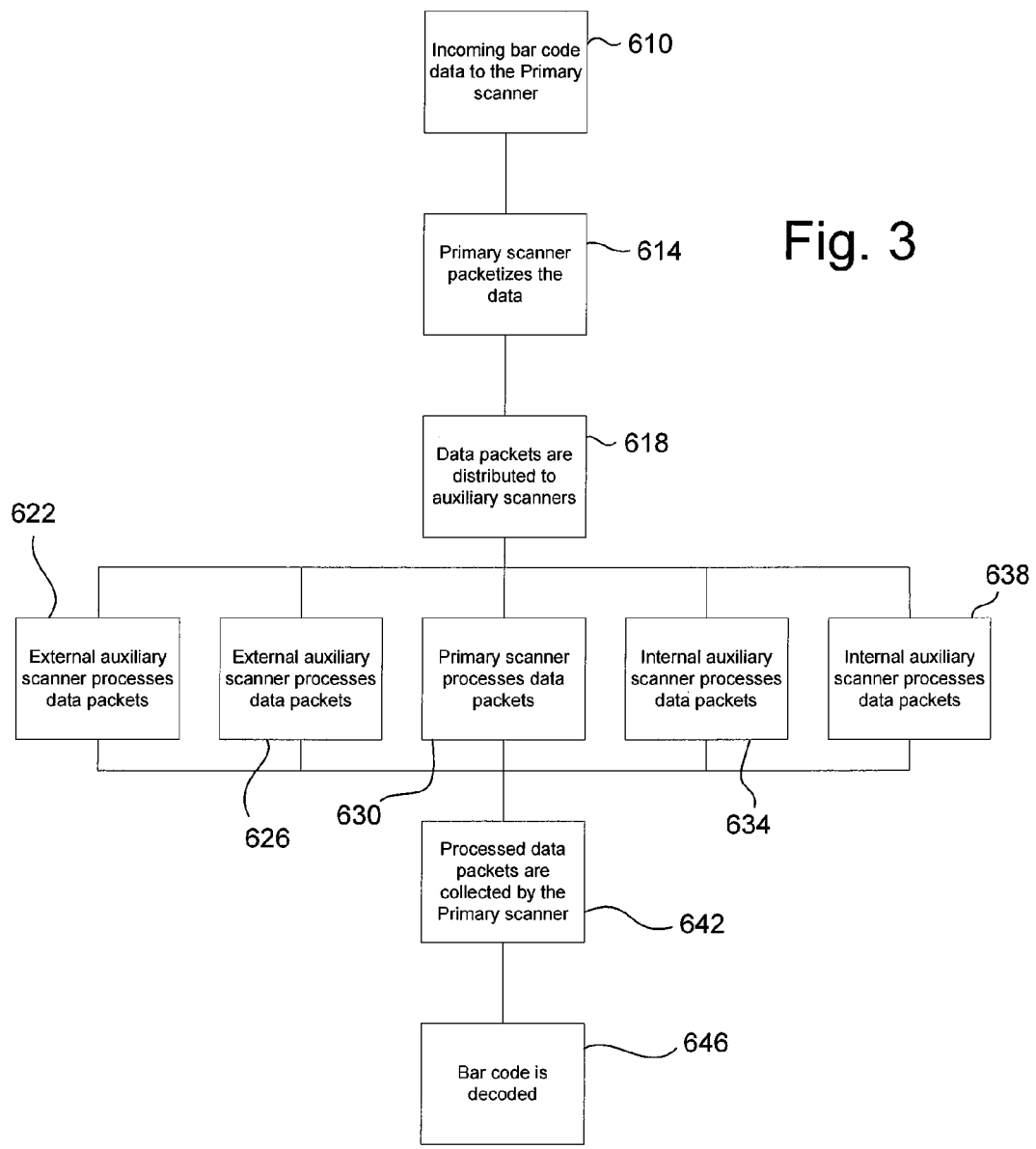

CLUSTER COMPUTING OF BAR CODE DATA

FIELD OF THE INVENTION

The present invention relates to information bearing device reading systems.

BACKGROUND

An exemplary information reading device (IRD) for reading information bearing devices (IBDs) or information data carriers (IDC) that have data encoded or provided therein. An IDC may provide data from a number of sources, such as "flash" type memory, (e.g. a memory device sometimes known as "Multimedia MMC," "Smart Media," "Compact Flash," and "Memory Stick.", memory stick or drive; a command entered from the point of transaction system; a command from the local host or server; a magnetic stripe; a RFID device; wireless transmission device such as a BLUETOOTH™, a biometric from a person, a barcode, etc. An exemplary reader may be an indicia bearing information (IBI) reader (also referred to as scanners, laser scanners, bi-optic reader, indicia readers, etc.) that reads data represented by printed or displayed IBI, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Indicia reading devices typically utilize visible or infrared light. Laser indicia reading devices typically utilize transmitted laser light.

Exemplary readers used in a high-throughput point of transaction (POT) application typically falls into a category of scanners or indicia readers known as bi-optic scanners.

Efforts regarding such systems have led to continuing developments to improve their versatility, practicality and efficiency.

BRIEF DESCRIPTION OF THE DRAWINGS

FIG. 3 is an exemplary flowchart of a method of operating an IBD reader system.

DETAILED DESCRIPTION

Figure 1:
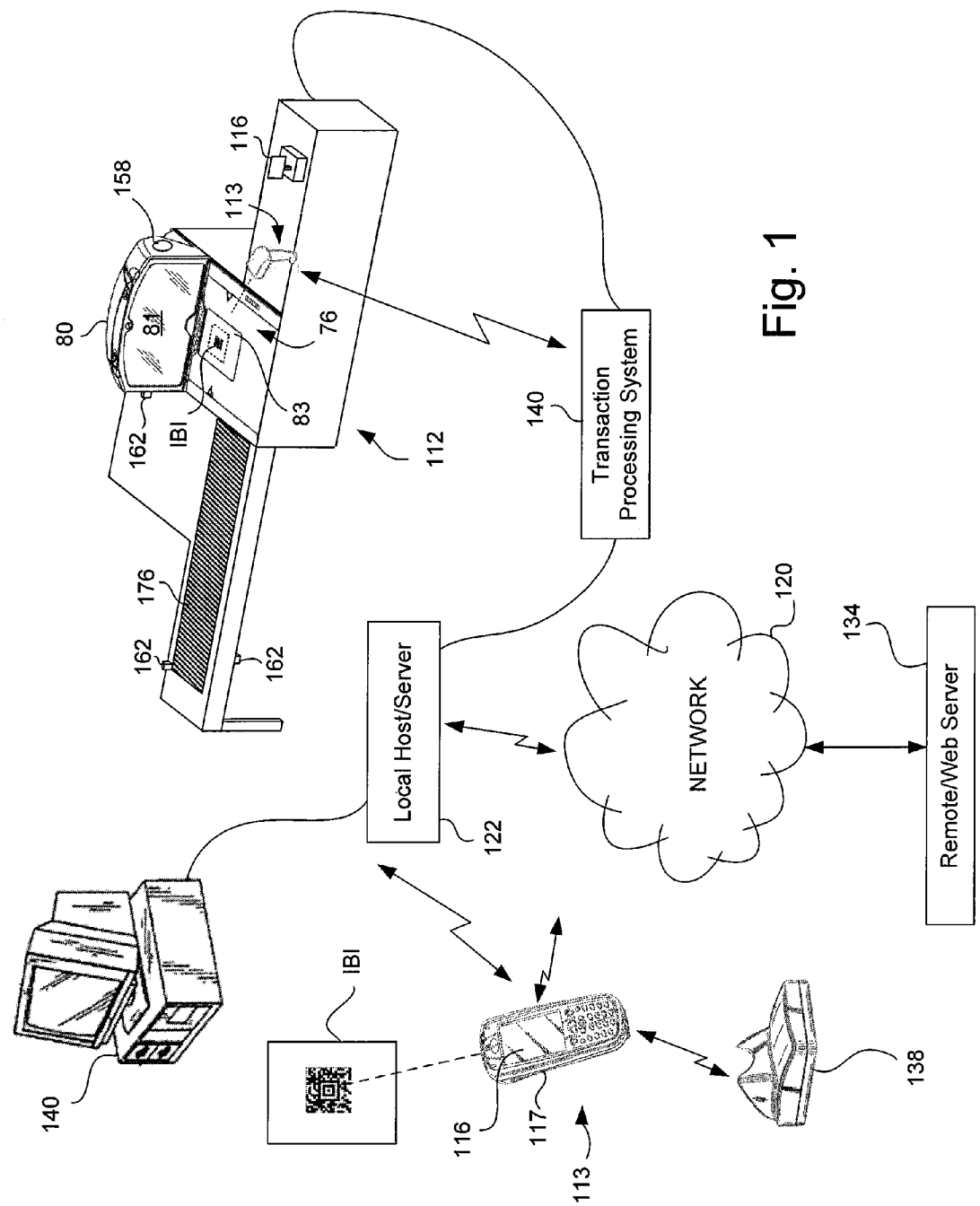
FIG. 1 is a block diagram of an exemplary IBD reader system.

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" may refer to reading or extracting data from IBD. The term "scanner" used herein refers to an IBD reader that reads IBDs, such as IBI barcodes. IBDs may be IBIs disposed on a printed medium such as an employee identification, customer loyalty card, displayed on the display of a mobile device such as a cellular phone, portable data terminal, hand held indicia reader, etc.

Referring to the figures, an exemplary reading system configuration comprises a primary IBD reader 112 operated by an establishment operator or operator and utilized where IBDs are present. Exemplary scanning systems may include bi-optic scanners, customer kiosks, optical indicia reading systems, etc. The reading system may also include auxiliary IBD readers 113.

Exemplary IBD readers may be in communication (wired or wireless) to a local transaction processing system 140, such as a cash register, customer station or employee station or local host/server 122 directly or through a charging station or base 138. An exemplary local server 122 or IBD reader 112, 113 may be in communication with network 120 and or a remote/web server 134.

A exemplary readers 112, 113 may be used in an establishment such as a store at a point of transaction (POT) or point of sale (POS). An exemplary reader may include a centrally-positioned double-sided rotating mirror or central spinner, first and second deflectors or directional mirrors, first and second wobbling mirrors, and a plurality of pattern mirrors. The scanning system may be mounted in a housing 80, wherein patterns mirrors may be positioned and aligned to direct two scanning patterns in different directions towards a common scanning field. Exemplary bi-optic scanners may have an optics bench 76 that combines vertical and horizontal laser output windows 81, 83 respectively that view the common scanning field or region for reading IBI targets on products that may be located on the bottom or sides of the products.

An exemplary bi-optic scanner has many scan lines that may produce a large amount of data that needs to be processed to find a valid bar code and decode it.

An exemplary use of the reader is as the primary or sole scanner at a customer point of transaction (POT) in an establishment. Primary may mean the scanner at a POT is used to scan or image items more often than any other scanner or imager at the POT. A transaction may be any of a number of events that occur between a customer and an establishment, such as a store. The events may involve such things as exchange of monetary funds, payment for merchandise or service, return of merchandise, picking up merchandise that has already been paid for, or contracting for a service (such as leasing or renting).

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an IBD such as an information bearing indicia (or symbol). The term imaging used herein refers to the taking or creation of an electronic image.

Exemplary methods may be conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor), but may also be implemented in a hardware processor. For example, the methods may be implemented with HDL (Hardware Design Language) in an ASIC.

Referring to the figures, an exemplary reader system configuration comprises a reader 112, 113 operated by an establishment operator or operator and utilized where IBDs are present. Exemplary readers may be scanning systems such as bi-optic scanners, customer kiosks, optical indicia reading systems, etc.

Exemplary reader systems may receive and process information from a number of sources, such as "flash" type memory, (e.g. a memory device sometimes known as "Multimedia MMC," "Smart Media," "Compact Flash," and "Memory Stick.", memory stick or drive; a command entered from the point of transaction system; a command from the local host or server; magnetic stripe; biometric information; RFID sensing system; wireless transmission systems such as a BLUETOOTH™, a biometric reader, etc.

The term "biometrics" generally refers to automated methods of recognizing a person based on a physiological or behavioral characteristic. Among the characteristics that may be measured include; facial features, fingerprints, hand geometry, handwriting iris, retinal, vein, profile, ear, voice etc. As such, the biometric sensor may comprise a finger print reader, an infrared imager, a microphone, a DNA analysis unit or a chemical analysis unit.

Exemplary readers may be in communication (wired or wireless) to a local transaction processing system 140, such as a cash register, customer station or employee station or local host/server 122 directly or through a charging station or base 138. An exemplary local server 122 or reader 112 may be in communication with network 120 and or a remote/web server 134.

An exemplary reader 112 may be used in an establishment such as a store at a point of transaction (POT) or point of sale (POS). An exemplary reader may include a centrally-positioned double-sided rotating mirror or central spinner, first and second deflectors or directional mirrors, first and second wobbling mirrors, and a plurality of pattern mirrors. The scanning system may be mounted in a housing 80, wherein patterns mirrors may be positioned and aligned to direct two scanning patterns in different directions towards a common scanning field. Exemplary bi-optic scanners may have an optics bench 76 that combines vertical and horizontal laser output windows 81, 83 respectively that view the common scanning field or region for reading IBI targets on products that may be located on the bottom or sides of the products.

An exemplary use of the exemplary reader is as the primary or sole reader at a customer point of transaction (POT) in an establishment. Primary may mean the reader at a POT is used to read IBD more often than any other reader at the POT. A transaction may be any of a number of events that occur between a customer and an establishment, such as a store. The events may involve such things as exchange of monetary funds, payment for merchandise or service, return of merchandise, picking up merchandise that has already been paid for, or contracting for a service (such as leasing or renting).

Exemplary readers may be in communication (wired or wireless) to a local transaction processing system 140, such as a cash register, customer station or employee station or local host/server 122 directly or through a charging station, base or cradle 138. An exemplary local server 122 or reader 112, 113 may be in communication with network 120 and or a remote/web server 134.

Figure 2:
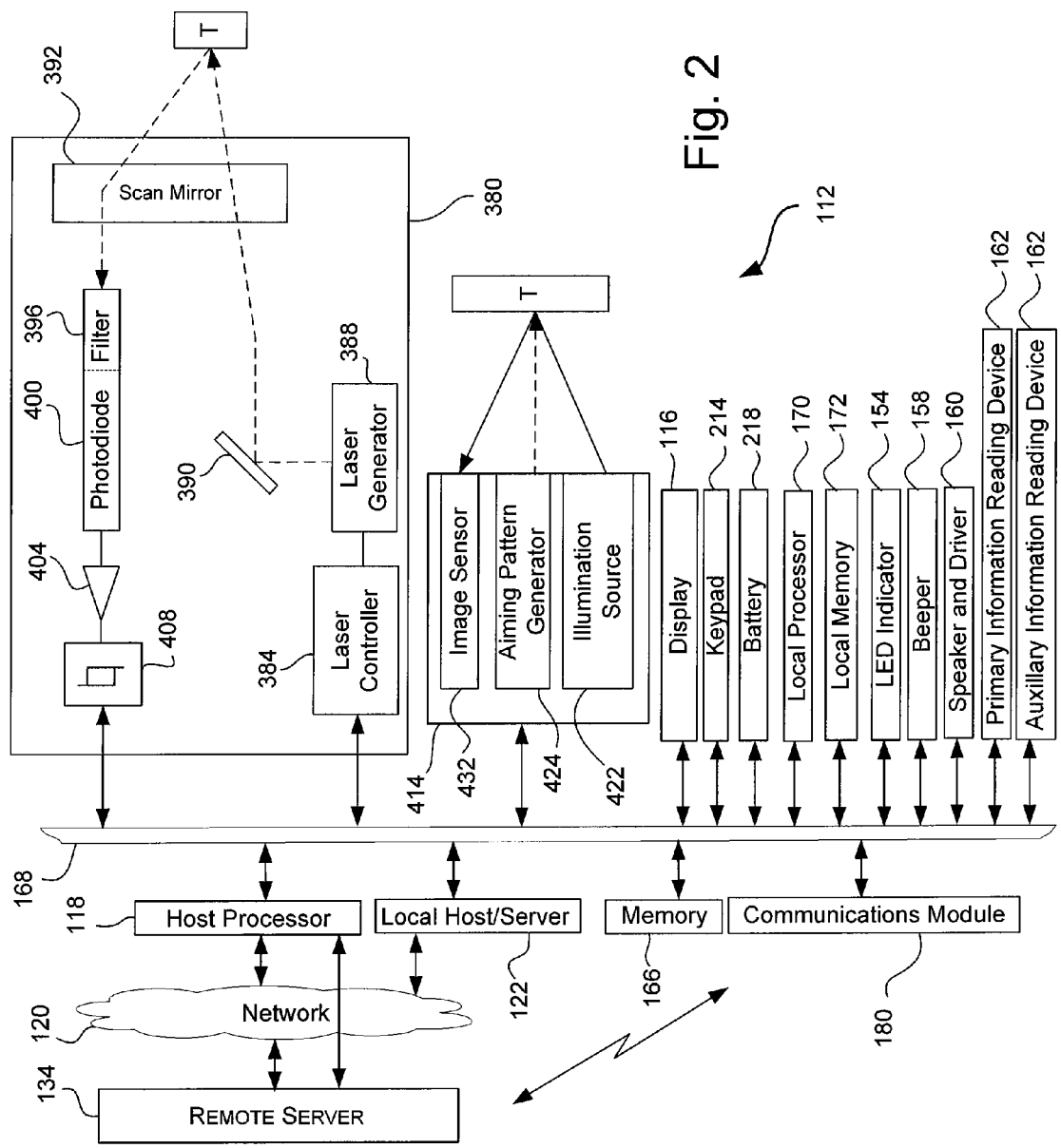
FIG. 2 is a simplified schematic block diagram of an exemplary IBD reader system.

Referring to FIG. 2, an exemplary reader 112, 113 may comprise a number of exemplary subsystems, such as laser scan engine 380 or laser scanning reader system for reading indicia (IBI) on a target T. The laser scanning reader system may comprise a laser controller 384 for controlling a laser generator 388 for generating a laser light beam which is directed onto a folding mirror 390 which then directs the laser light beam to an oscillating or rotating scan mirror 392 to project a scanning pattern onto target T. The laser scanning pattern is reflected off of the target and redirected by scan mirror 392 into a receive path comprising a laser light pass filter 396, a photodiode 400, an amplifier 404 and a digitizer 408.

Laser light may be described as a spatially coherent, narrow low-divergence beam of light.

Digitizer 408 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream, including decoding of IBIs.

An exemplary reader 112, 113 may comprise one or more optical image engines (image indicia reader systems or optical scan engines) 610 for reading indicia on a target T. Optical image engines capture and read images to detect and decode IBIs located within the captured images. The optical image indicia reader systems may comprise one or more illumination source(s) 618 for illuminating an IBI with a beam or pattern of incoherent light in the form of an illumination pattern and an image sensor 432 for converting light reflected off a target T having an IBI provided thereon into representative output signals thereof. The output signal of the image sensor may be processed utilizing one or more functions or algorithms to condition the signal appropriately for use in further processing downstream, including decoding of IBIs.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color, monochrome or monocolor 2D solid state image sensor implemented in any of CCD, CMOS, NMOS, PMOS, CID, CMD, back-illuminated technologies. The reader may be able to operate in either a progressive scan or interleaved scan mode. The image sensor may contain an array of light sensitive photodiodes (or pixels) that convert incident light energy into electric charge. Many solid state image sensors also allow regions of a full frame of image data to be addressed.

Other exemplary reader subsystems or components may include one or more local or on board processor(s) 170, local memory 172, a battery 218, a display 116, a key pad 214 and a wireless communications module 180. The subsystems may communicate via one or more bus 168, data lines or other signal or data communication form. The reader may communicate with one or more host processor(s) 118, a local host/server 122, local memory 166, network 120 or remote server host/server 134.

An exemplary bi-optic bar code scanner has the ability to have auxiliary IBD readers in communication with it that may be external or internal to the bi-optic scanner. The auxiliary IBD readers may process all data simultaneously and decode IBD presented to it.

In an exemplary embodiment a bi-optic scanner may packetize data being received from readers which are distributed to the auxiliary readers for processing. As each reader (bi-optic and auxiliary) processes a data packet the result is stored in the bi-optic scanner or a host or remote server. When a sufficient number of packets have been processed the IBD may be decoded. In an exemplary embodiment, it is not necessary that all of the packets are processed to decode an IBD, thereby providing more processing power for poor quality codes, low contrast codes, and stitching of code segments.

In an exemplary flowchart for operating a reading system illustrated in FIG. 3, an IBD is read by a primary reader in a step 610, which packetizes in a step 614. The data packets are distributed to one or more auxiliary readers in a step 618. The data packets are processed by the primary and auxiliary readers in steps 622, 626, 630, 634, 638. Auxiliary readers may be internal or external. The processed data packets are collected by the primary reader in a step 642 and the IBD is decoded in a step 646.

Communications module 180 may provide a communication link from reader 112 to other readers or to other systems such as a server/remote processor 134.

The processor(s) may be disposed on board or within the housing with other subsystems. The particulars of the functionality of the processor(s) and the reader may be determined by or based upon certain configuration settings or data which may be stored in firmware, remote or local memory. Configuration settings may be arranged as stored parameter tables.

An exemplary processor may be a mixed-signal array with on-chip controller devices designed to replace multiple traditional MCU-based system components with one single-chip programmable device. It may include configurable blocks of analog and digital logic, as well as programmable interconnects.

The subsystems in the reader may be connected by one or more bus 168, data lines or other signal or data communication form. Exemplary forms may be an Inter-IC bus such as a two wire interface (TWI), dedicated data bus, RS232 interface, USB, etc.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon certain configuration settings stored in firmware or memory which may be any one of a number of memory types such as RAM, ROM, EEPROM, etc. In addition some memory functions may be stored in memory provided as part of the processor(s).

Exemplary functions of the processor(s) may be controlling operation the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are disposed within the housing of the reader. Decoding is a term used to describe the interpretation of a machine readable code contained in the photodetector output signal.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader will use. Two exemplary modes may be continuous or discontinuous. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans one after another (seriatim) and continuously decodes or attempts to decode some or all scanned targets. Discontinuous mode is a mode wherein scanning and/or decoding stops or is interrupted and initiated with an actuation event, such as pulling of a single pull trigger 115, a timeout, or a successful read to restart. An exemplary utilization of the reader in discontinuous mode is via hand held operation. Decoding stops once the reader is no longer triggered. The discontinuous mode is typically initiated because the operator knows a symbol is present.

Exemplary readers may use memory or firmware to store certain reader settings or reader configuration settings. Exemplary configuration settings may be selection of scanning distance, trigger functionality, pre-defined bar code output data based on the scan input, continuous scanning mode, discontinuous scanning mode or routine, decoding mode or routine, I/O configurations, symbology enablement, output interface functionality, min/max symbology character lengths, scan engine selection, illumination functionality, settings that affect the functional operation of the processor(s), which codes are enabled for processing, aimer operation, engine orientation, illumination, photosensor functionality, software control, sales tracking or warranty tracking, reader capabilities, etc.

Readers and a host system may be equipped with the ability to automatically query and communicate data, such as configuration settings or firmware amongst each other. Upgrading firmware from host to reader and duplicating configuration settings may be performed without human intervention to ensure readers are operating at the same revision and have the same configuration settings reduces user frustration, down time, data integrity and increase efficiencies.

At predetermined time intervals a host system may broadcast various information, such as firmware revision, configuration settings, etc. The host may then download the newer files and update readers during a time of inactivity. Readers may use on board memory or firmware flash memory to store certain configuration settings.

Readers may be configured via serial connection using serial commands. A GUI interface may be utilized for creating or reading serial commands, such as Visual Menu or similar such product. This may be done locally or remotely by connecting the optical reader either directly or through a network (such as the internet) to a remote computer and having the remote computer provide software upgrades.

Software upgrades may be necessary for migration from one reader to new or other readers, possibly different manufacturers. Upgrading may be simplified if the configuration of the reader being replaced is matched or matches the configuration of the equipment that it is replacing.

If reader software is replaced, the reader may have the ability to automatically read out configuration settings information in memory and allow the software to adapt and use different methods of control, or different methods of decoding, etc.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Another exemplary embodiment may be to provide a PC based software tool that analyzes output scanned data of a known IBD from a target reader (the one being replaced) and compares it with the output data from the replacement reader. The software tool may interpret how the existing device is configured based on the difference between the two sets of data. After interpolation of the configuration settings of the replacement reader, the software tool may configure the replacement reader to match the old or replacement reader. This may be considered indirect mapping, wherein the software tool interpolates the inner settings of an existing device from its operation, rather than by direct read out from memory or firmware.

Either exemplary embodiment may be integrated with a cross-browser, client-side DHTML menu builder such as Visual Menu. The configuration of a reader may be read out once and then propagated many times using wireless or over-the-net configuration utilities, hard copy or video display menuing or other suitable means.

A user may update or replace one or more stored configuration settings or configuration setting data utilizing a remote updating system which may be done by connecting the reader either directly or through a network (such as the internet) to a remote processor. With appropriate software, the remote processor may be programmed to read certain configuration settings from the reader, such as software configuration. The remote processor may read the configuration setting data and utilize that data when downloading updates or new software. An operator may request from the remote processor for a software update. The request may be received by either computer, which could read the current software configuration resident on the optical reader and determine the appropriate update or replacement software. Certain bar code symbology types have special data codewords or characteristics which identify them as to be used for configuration. Bar codes which are created utilizing these codewords or characteristics are commonly referred to as configuration bar codes, menuing bar codes, or menuing IBIs. Typically, a scanning device will come with a manual which has configuration bar codes inside which are used to specifically configure that device. The data contained in the configuration bar code is used to identify which setting to address, and what value to load for that setting. In some cases if the setting has a range of acceptable values which is very large, several configuration bar codes, one which addresses the setting and one or more others which define the value, are scanned in succession to configure the setting.

In an exemplary embodiment, a reader may be configured by reading IBDs from a user's application (i.e. not menuing IBIs) to configure the reader for setup in their application. Hand held readers are typically utilized for dual purpose scanning.

In an exemplary embodiment, a method of operating a reading system involves the steps of: reading an information bearing device (IBD) having encoded IBD data provided therein with an first reader; transmitting the IBD data to a second reader; wherein the second reader: packetizes the encoded IBD data and processes a first data packet of the packetized encoded data; and transmits a second data packet of the packetized encoded data to another reader, wherein the other reader processes the second data packet; and combining the processed first and second data packets to produce decoded IBD data.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method of operating a reading system comprising the steps of:
    reading an information bearing device (IBD) having encoded IBD data provided therein with a primary reader, wherein the primary reader:
    packetizes the encoded data and processes a first data packet of the packetized encoded data; and
    transmits a second data packet of the packetized encoded data to an auxiliary reader, wherein the auxiliary reader processes the second data packet;
    transmitting the processed second data packet to the primary reader; and combining the processed first and second data packets to produce decoded IBD data.

2. A method of operating a reading system in accordance with claim 1, wherein the primary reader comprises a bi-optic scanner.

3. A method of operating a reading system in accordance with claim 1, wherein the at least one auxiliary reader comprises a hand held reader.

4. A method of operating a reading system in accordance with claim 1, wherein the primary reader comprises a bi-optic scanner and the at least one auxiliary reader is internal to the bi-optic scanner.

5. A method of operating a reading system in accordance with claim 1, wherein the primary reader comprises a bi-optic scanner and the at least one auxiliary reader is external to the bi-optic scanner.

6. A method of operating a reading system in accordance with claim 1, wherein the primary and auxiliary readers process first and second data sets simultaneously.

7. A reading system comprising:
    a primary reader for reading an information bearing device (IBD) having encoded IBD data provided therein for packetizing the encoded data and processing a first data packet of the packetized encoded data and transmitting a second data packet of the packetized encoded data;
    at least one auxiliary reader for receiving and processing the second data packet and the transmitting the processed second data packet; and
    wherein the processed first and second data packets are combined to produce decoded IBD data.

8. A reading system according to claim 7, wherein the primary reader comprises a bi-optic scanner.

9. A reading system according to claim 7, wherein the at least one auxiliary reader comprises a hand held scanner.

10. A reading system according to claim 7, wherein the primary reader comprises a bi-optic scanner and the at least one auxiliary reader is internal to the bi-optic scanner.

11. A reading system according to claim 7, wherein the primary reader comprises a bi-optic scanner and the at least one auxiliary reader is external to the bi-optic scanner.

12. A reading system according to claim 7, wherein the primary and auxiliary readers process first and second data sets simultaneously.

13. A method of operating a reading system comprising the steps of:
    reading an information bearing device (IBD) having encoded IBD data provided therein with an first reader, transmitting the IBD data to a second reader;
    wherein the second reader:
    packetizes the encoded IBD data and processes a first data packet of the packetized encoded data; and
    transmits a second data packet of the packetized encoded data to another reader, wherein the other reader processes the second data packet; and
    combining the processed first and second data packets to produce decoded IBD data.

14. A method of operating a reading system in accordance with claim 13, wherein the first reader comprises a primary reader.

15. A method of operating a reading system in accordance with claim 13, wherein the first reader comprises an auxiliary reader.

16. A method of operating a reading system in accordance with claim 13, wherein the first reader comprises a bi-optic scanner.

17. A method of operating a reading system in accordance with claim 13, wherein the first reader comprises a hand held reader.

18. A method of operating a reading system in accordance with claim 13, wherein the first reader comprises a hand held reader that is an auxiliary reader.

* * * * *